United States Patent
Ishida et al.

(10) Patent No.: US 7,462,576 B2
(45) Date of Patent: Dec. 9, 2008

(54) AUTOMOBILE EXHAUST GAS PURIFYING COMBUSTION CATALYSTS

(75) Inventors: Masao Ishida, Wako (JP); Tadahisa Masatani, Wako (JP); Miyako Koga, Wako (JP); Kazuo Shibahara, Hozumi (JP); Kenichi Tsuge, Hozumi (JP)

(73) Assignees: Honda Giken Kogyo Kabushiki Kaisha, Tokyo (JP); Japan Insulation Co., Ltd, Osaka (JP)

( * ) Notice: Subject to any disclaimer, the term of this patent is extended or adjusted under 35 U.S.C. 154(b) by 509 days.

(21) Appl. No.: 10/827,058

(22) Filed: Apr. 19, 2004

(65) Prior Publication Data

US 2004/0228784 A1     Nov. 18, 2004

(30) Foreign Application Priority Data

Apr. 25, 2003   (JP) .............................. 2003-122622

(51) Int. Cl.
  B01B 21/00  (2006.01)
  B01J 23/00  (2006.01)
  B01J 23/70  (2006.01)
  B01J 23/72  (2006.01)

(52) U.S. Cl. ...................... 502/244; 502/250; 502/345

(58) Field of Classification Search ................. 502/244, 502/345, 250
  See application file for complete search history.

(56) References Cited

U.S. PATENT DOCUMENTS

| | | | |
|---|---|---|---|
| 3,981,923 A | | 9/1976 | Stouthamer et al. |
| 4,042,313 A | * | 8/1977 | Pierce ............................ 431/4 |
| 5,106,810 A | * | 4/1992 | Cheng et al. ................. 502/241 |
| 5,977,010 A | * | 11/1999 | Roberts et al. ............... 502/244 |
| 6,024,933 A | * | 2/2000 | Legendre et al. ......... 423/567.1 |

FOREIGN PATENT DOCUMENTS

| | | |
|---|---|---|
| JP | 53-030995 | 3/1978 |
| JP | 53-056164 | 5/1978 |
| JP | 55049146 A | 4/1980 |
| JP | 07-256113 | 10/1995 |
| JP | 2002-371831 | 12/2002 |
| WO | WO 97/37749 | 10/1997 |

OTHER PUBLICATIONS

Office Action for German Patent Application No. 10 2004 018 947. 5-47, issued Mar. 30, 2007.

* cited by examiner

*Primary Examiner*—Cam N. Nguyen
(74) *Attorney, Agent, or Firm*—Knobbe, Martens, Olson & Bear LLP

(57) ABSTRACT

The present invention provides combustion catalysts that have high exhaust gas-purifying activity and are less expensive than conventional ones.

The catalysts include:
  (1) A calcium salt, amorphous silica, and a copper compound,
  (2) Amorphous silica, and a copper compound,
  (3) (1) At least one of crystalline silica and amorphous silica, (2) a calcium salt, and (3) a copper oxide, and
  (4) (1) At least one of crystalline silica and amorphous silica, and (2) a copper oxide.

8 Claims, 2 Drawing Sheets

AUTOMOBILE EXHAUST GAS PURIFYING COMBUSTION CATALYSTS

TECHNICAL FIELD

The present invention relates to automobile exhaust gas purifying combustion catalysts. Note that 'automobile' in the present specification also includes motorcycles and motorized bicycles.

BACKGROUND ART

Hitherto, various combustion catalysts for purifying the exhaust gas of automobiles have been developed. For example, combustion catalysts comprising a carrier made of alumina or the like having a catalytically active precious metal such as platinum, rhodium or palladium supported thereon are known.

Specifically, in Japanese Patent Application Laid-open No. 7-256113 there is disclosed a combustion catalyst for purifying exhaust gas, characterized in that a first coating layer having as a principal component thereof activated alumina containing a precious metal selected from the group consisting of platinum, palladium and rhodium is provided on a catalyst carrier, a second coating layer comprising an inorganic material having as a principal component thereof activated alumina not containing a precious metal component is provided on the first coating layer, and a third coating layer comprising an inorganic material having as a principal component thereof a zeolite powder that has been subjected to ion exchange with a metal is provided on the second coating layer to form a catalyst, and this catalyst is disposed on the upstream side of a catalytic converter, and a three-way catalyst is disposed on the downstream side of the catalytic converter.

Of existing combustion catalysts, it is known that in particular combustion catalysts having a precious metal as an active component as described above have high exhaust gas purifying activity. However, such combustion catalysts have the problem that the cost is high due to the precious metal component being expensive. In particular, in the case of using alumina or the like as a carrier, the cost becomes yet higher.

There are thus calls for the development of combustion catalysts that have high exhaust gas purifying activity but are less expensive than conventional ones.

DISCLOSURE OF THE INVENTION

It is a principal object of the present invention to provide combustion catalysts that have high exhaust gas purifying activity and are less expensive than conventional ones.

The present inventor carried out assiduous studies to attain the above object, and as a result discovered that the above object can be attained through materials comprising specific inorganic materials and copper compounds (including copper oxides), thus achieving the present invention.

That is, the present invention relates to automobile exhaust gas purifying combustion catalysts, methods of manufacturing the same, and an automobile exhaust gas purifying method as follows.

An automobile exhaust gas purifying combustion catalyst, comprising a calcium salt, amorphous silica, and a copper compound (the first invention).

An automobile exhaust gas purifying combustion catalyst, comprising amorphous silica, and a copper compound (the second invention).

An automobile exhaust gas purifying combustion catalyst, comprising (1) at least one of crystalline silica and amorphous silica, (2) a calcium salt, and (3) a copper oxide (the third invention).

An automobile exhaust gas purifying combustion catalyst, comprising (1) at least one of crystalline silica and amorphous silica, and (2) a copper oxide (the fourth invention).

A method of manufacturing the automobile exhaust gas purifying combustion catalyst of the first invention, comprising reacting a calcium silicate and a copper salt together.

A method of manufacturing the automobile exhaust gas purifying combustion catalyst of the second invention, comprising reacting a calcium silicate and a copper salt together, and washing the reaction product obtained with water, or washing the reaction product obtained with water after carrying out acid treatment or treatment with an aqueous copper salt solution.

A method of manufacturing the automobile exhaust gas purifying combustion catalyst of the third invention, comprising reacting a calcium silicate and a copper salt together, and baking the reaction product obtained.

A method of manufacturing the automobile exhaust gas purifying combustion catalyst of the fourth invention, comprising reacting a calcium silicate and a copper salt together, washing the reaction product obtained with water, or washing the reaction product obtained with water after carrying out acid treatment or treatment with an aqueous copper salt solution, and then further baking.

A method of manufacturing the automobile exhaust gas purifying combustion catalyst of the fourth invention, comprising reacting a calcium silicate and a copper salt together, baking the reaction product obtained, and then further washing with water, or washing with water after carrying out acid treatment or treatment with an aqueous copper salt solution.

In one embodiment, in any of the methods described above, the copper salt reacted with the calcium silicate is copper oxalate.

The present invention also provides an automobile exhaust gas purifying combustion catalyst obtained by any of the methods described above.

In one embodiment, any of the automobile exhaust gas purifying combustion catalysts described above is used for removing carbon monoxide and/or propylene contained in automobile exhaust gas.

In another embodiment, any of the automobile exhaust gas purifying combustion catalysts described above is used for converting carbon monoxide and/or propylene contained in automobile exhaust gas into carbon dioxide and/or water.

The present invention also provides an automobile exhaust gas purifying method, comprising bringing any of the automobile exhaust gas purifying combustion catalyst described above into contact with automobile exhaust gas.

Following is a detailed description of the automobile exhaust gas purifying combustion catalysts, the methods of manufacturing the same, and the automobile exhaust gas purifying method, according to the present invention.

1-1. Automobile Exhaust Gas Purifying Combustion Catalyst of the First Invention A combustion catalyst of the first invention comprises a calcium salt, amorphous silica, and a copper compound.

There are no particular limitations on the calcium salt(s); for example, gypsum, calcium chloride, calcium nitrate, calcium acetate, calcium oxalate, and so on can be used.

There are no particular limitations on the amorphous silica; a publicly known one or a commercially sold one can be used.

There are no particular limitations on the copper compound(s); ones that can be used include, for example: $CaCu_4(SO_4)_2(OH)_6 \cdot xH_2O$ (wherein x is approximately 3), $Cu_4(SO_4)(OH)_6$ and so on, which are produced in the case of reacting calcium silicate with a sulfate of copper; $Cu_4(OH)_6Cl_2 \cdot 3H_2O$, $Cu_2(OH)_3Cl$ and so on, which are produced in the case of reacting calcium silicate with a chloride of copper; $Cu_2(OH)_3NO_3$ and so on, which are produced in the case of reacting calcium silicate with a nitrate of copper; a copper compound having X-ray diffraction peaks near $2\theta=23.5°$ and near $2\theta=31.0°$ as shown in FIG. 1, which is produced in the case of reacting calcium silicate with an oxalate of copper.

There are no particular limitations on the proportions of the calcium salt(s), the amorphous silica and the copper compound(s) contained in the combustion catalyst; these proportions will vary in accordance with the types of raw materials used and so on, and can, for example, be set as appropriate in accordance with the purpose, desired properties and so on of the final product, from the ranges indicated later in the section on the manufacturing method.

In addition to the above three components, the combustion catalyst may contain additives, so long as this is within ranges such as not to interfere with the combustion catalyst activity. There are no particular limitations on such additives; ones publicly known in the field of combustion catalysts can be used. The types, amounts used and so on of the additives can be set as appropriate in accordance with the purpose, desired properties and so on of the final product.

1-2. Method of Manufacturing Combustion Catalyst of the First Invention

There are no particular limitations on the method of manufacturing the combustion catalyst, so long as a combustion catalyst comprising the three prescribed components is obtained. Examples of the manufacturing method include a method in which the calcium salt(s), the amorphous silica and the copper compound(s) are mixed together, and a method in which compounds are reacted together such that at least the three prescribed components are produced through the reaction.

Of these, a method that falls under the latter (i.e. a method using reaction), in particular a method in which calcium silicate and a copper salt are reacted together is preferable. Following is a description of this manufacturing method.

There are no particular limitations on the calcium silicate, which may be either synthetic calcium silicate or natural calcium silicate, although considering reactivity, formability and so on, synthetic calcium silicate is preferable.

Examples of synthetic calcium silicate are that obtained through a hydrothermal reaction between a lime raw material and a silicate raw material, for example xonotlite, tobermorite, foshagite, gyrolite, α-dicalcium silicate, tricalcium silicate, hillebrandite, rosenhanite, truscottite, reyerite, calciochondrodite, kilchoanite, afwillite or the like. Moreover, other examples include hydrated synthetic calcium silicate such as quasi-crystalline calcium silicate (CSHn), and wallastonite obtained by heating a hydrated synthetic calcium silicate such as the above-mentioned xonotlite, tobermorite, and so on.

The copper salt is preferably one that will react with the calcium silicate to produce the calcium salt(s), the amorphous silica and the copper compound(s). Examples include a sulfate, a nitrate, a carbonate, an acetate, an oxalate, a chloride, and various complex salts of copper. Of these, an oxalate of copper is particularly preferable.

Specific examples include $CuSO_4$, $CuSO_4 \cdot 5H_2O$, $Cu_2O(SO_4)$, $Cu_4O(OH)_4SO_4$, $Cu_4O_3SO_4$, $Cu(NO_3)_2 \cdot 3H_2O$, $Cu(CH_3COO)_2 \cdot H_2O$, $CuCl_2$, $CuCl_2 \cdot 2H_2O$, $CuC_2O_4 \cdot \frac{1}{2}H_2O$ and so on. Of these, $CuC_2O_4 \cdot \frac{1}{2}H_2O$ (copper oxalate) is particularly preferable. In the case of using copper oxalate, a combustion catalyst having high exhaust gas purifying activity is easily obtained.

There are no particular limitations on the method of reacting the calcium silicate and the copper salt together. Examples include a method in which the copper salt is mixed into aqueous slurry of the calcium silicate, a method in which a solution of the copper salt is impregnated into a molded body of the calcium silicate, and a method in which a powder of the calcium silicate is mixed into a solution of the copper salt.

There are no particular limitations on the amount of the copper salt reacted with the calcium silicate; this amount can be set as appropriate considering the purpose, desired properties and so on of the final product. The amount of the copper salt may be a reaction equivalent relevant to the calcium silicate, or may be an amount exceeding this or less than this.

Through the reaction between the calcium silicate and the copper salt, the following are obtained: a calcium salt such as gypsum, calcium chloride, calcium nitrate, calcium acetate or calcium oxalate; amorphous silica; at least one of $CaCu_4(SO_4)_2(OH)_6 \cdot xH_2O$ (wherein x is approximately 3), $Cu_4SO_4(OH)_6$, $Cu_4(OH)_6Cl_2 \cdot 3H_2O$, $Cu_2(OH)_3Cl$, $Cu_2(OH)_3NO_3$, a copper compound having X-ray diffraction peaks near $2\theta=23.5°$ and near $2\theta=31.0°$ as shown in FIG. 1, and so on.

More specifically, in the case of using $CuSO_4 \cdot 5H_2O$ as the copper salt, the following will be obtained through the reaction with the calcium silicate: calcium salt(s) such as $CaSO_4 \cdot 2H_2O$ and $CaSO_4 \cdot \frac{1}{2}H_2O$; amorphous silica; and copper compound(s) such as $CaCu_4(SO_4)(OH)_6 \cdot xH_2O$ (wherein x is approximately 3) and $Cu_4(SO_4)(OH)_6$ (basic copper compound(s)). Moreover, in the case of using $CuC_2O_4 \cdot \frac{1}{2}H_2O$ as the copper salt, the following will be obtained through the reaction with the calcium silicate: calcium salt(s) such as $CaC_2O_4 \cdot H_2O$ and $CaC_2O_4$; amorphous silica; and a copper compound having X-ray diffraction peaks near $2\theta=23.5°$ and near $2\theta=31.0°$ as shown in FIG. 1, and so on.

In the case of using the copper salt in an amount less than a reaction equivalent relative to the calcium silicate, unreacted calcium silicate may remain in the reaction product, but this will not hinder the catalytic performance. Moreover, even in the case that a calcium silicate molded body is used and only the surface layer part of the calcium silicate molded body reacts with the copper salt, there will be no hindrance of the catalytic performance.

The reaction product obtained in this way (in the case of reacting a powder of the calcium silicate with a solution of the copper salt, the reaction product obtained by filtering the suspension after the reaction) is made into a desired form by shaping or the like if necessary, and drying or the like is carried out if necessary, whereby the prescribed combustion catalyst comprising calcium salt(s), amorphous silica and copper compound(s) is obtained.

There are no particular limitations on the proportions of the prescribed components contained in the combustion catalyst obtained using the method described above, but usually, out of 100 wt % of the combustion catalyst, the proportion of the calcium salt(s) is approximately 1 to 50 wt %, the proportion of the amorphous silica is approximately 1 to 30 wt %, and the proportion of the copper compound(s) is approximately 2 to 85 wt %. Note, however, that the proportions of the respective components can be set as appropriate in accordance with the desired properties and so on of the combustion catalyst, and are not necessarily limited to being within the above ranges.

There are no particular limitations on the method of shaping the reaction product; examples include a pressing method, an extrusion molding method, a casting method, a papermaking method, a granulation method, and so on. If necessary, heating may be carried out during the shaping, and drying, steam curing or the like may be carried out after the shaping. Moreover, the molded body may be ground into a powder.

2-1. Automobile Exhaust Gas Purifying Combustion Catalyst of the Second Invention A combustion catalyst of the second invention comprises amorphous silica, and a copper compound.

There are no particular limitations on the amorphous silica; a publicly known one or a commercially sold one can be used.

There are no particular limitations on the copper compound(s); the same ones as those described for the combustion catalyst of the first invention can be used.

There are no particular limitations on the proportions of the amorphous silica and the copper compound(s) contained in the combustion catalyst; these proportions will vary in accordance with the types of raw materials used and so on, and can, for example, be set as appropriate in accordance with the purpose, desired properties and so on of the final product, from the ranges indicated later in the section on the manufacturing method.

In addition to the above two components, the combustion catalyst may contain additives, so long as this is within ranges such as not to interfere with the combustion catalyst activity. There are no particular limitations on such additives; ones publicly known in the field of combustion catalysts can be used. The types, amounts used and so on of the additives can be set as appropriate in accordance with the purpose, desired properties and so on of the final product.

2-2. Method of Manufacturing Combustion Catalyst of the Second Invention

There are no particular limitations on the method of manufacturing the combustion catalyst, so long as a combustion catalyst comprising the two prescribed components is obtained. Examples of the manufacturing method include a method in which the amorphous silica and the copper compound(s) are mixed together, and a method in which compounds are reacted together such that at least the two prescribed components are produced through the reaction.

Of these, a method that falls under the latter (i.e. a method using reaction), in particular a method in which calcium silicate and a copper salt are reacted together, and then the reaction product obtained is washed with water, or is washed with water after carrying out acid treatment or treatment with an aqueous copper salt solution is preferable. Following is a description of this manufacturing method.

There are no particular limitations on the calcium silicate and the copper salt; the same ones as those described for the combustion catalyst of the first invention can be used.

There are also no particular limitations on the method of reacting the calcium silicate and the copper salt together, or on the amount of the copper salt reacted with the calcium silicate; these may be set as described for the combustion catalyst of the first invention.

Through the reaction between the calcium silicate and the copper salt, a reaction product as described for the combustion catalyst of the first invention, i.e. a reaction product comprising calcium salt(s), amorphous silica and copper compound(s) is obtained.

In the case of using the copper salt in an amount less than a reaction equivalent relative to the calcium silicate, unreacted calcium silicate may remain in the reaction product, but this will not hinder the catalytic performance. Moreover, even in the case that a calcium silicate molded body is used and only the surface layer part of the calcium silicate molded body reacts with the copper salt, there will be no hindrance of the catalytic performance.

Next, the reaction product is washed with water, or is washed with water after carrying out acid treatment or treatment with an aqueous copper salt solution. There are no particular limitations on the conditions for carrying out the washing with water, or for carrying out the acid treatment or treatment with an aqueous copper salt solution and then carrying out the washing with water, so long as calcium salt(s) contained in the reaction product can be sufficiently dissolved in the water and thus removed.

The washing with water is preferably carried out by making the reaction product contact water.

For acid treatment, for example, an acid treatment liquid such as sulfuric acid, nitric acid, hydrochloric acid or acetic acid can be used. There are no particular limitations on the concentration of the acid treatment liquid, but this concentration is usually approximately 1 to 12 N, preferably approximately 3 to 8 N. The acid treatment is preferably carried out by making the reaction product contact the acid treatment liquid.

For treatment with an aqueous copper salt solution, an aqueous solution of, for example, a sulfate, a nitrate, an acetate, a chloride or the like of copper can be used. There are no particular limitations on the concentration of the copper salt aqueous solution, but this concentration is usually approximately 2 to 30 wt %, preferably approximately 3 to 10 wt %. The treatment is preferably carried out by making the reaction product contact the aqueous solution in question.

Such acid treatment or treatment with an aqueous copper salt solution is effective, for example, in the case of using copper oxalate as the copper salt that is reacted with the calcium silicate. The reason for this is reaction between copper oxalate and calcium silicate is hardly soluble in water, and hence the calcium oxalate cannot be removed merely by washing with water. However, if, through acid treatment or treatment with an aqueous copper salt solution, for example contact with a copper sulfate aqueous solution, the calcium oxalate is converted into calcium sulfate, which is soluble in water, then this calcium sulfate can be removed through the subsequent washing with water. Even if the copper salt that is reacted with the calcium silicate is a copper salt other than copper oxalate, such acid treatment or treatment with an aqueous copper salt solution can of course be suitably applied in other cases that a calcium salt that is hardly soluble or insoluble in water is produced.

After the acid treatment or treatment with an aqueous copper salt solution, the reaction product is washed with water. It is preferable to carry out the washing with water until the reaction product becomes neutral. Depending on the treatment conditions, a small amount of a calcium salt may unavoidably remain in the reaction product, but this will not particularly hinder the catalytic performance.

There are no particular limitations on the proportions of the prescribed components contained in the combustion catalyst obtained using the method described above, but usually, out of 100 wt % of the combustion catalyst, the proportion of the amorphous silica is approximately 0.5 to 40 wt %, and the proportion of the copper compound(s) is approximately 3 to 95 wt %. Note, however, that the proportions of the respective components can be set as appropriate in accordance with the desired properties and so on of the combustion catalyst, and are not necessarily limited to being within the above ranges.

There are no particular limitations on the method of shaping the reaction product; a method as described for the combustion catalyst of the first invention can be used. Note, however, that it is preferable to carry out the washing with water, and/or the acid treatment or treatment with an aqueous copper salt solution before the shaping.

3-1. Automobile Exhaust Gas Purifying Combustion Catalyst of the Third Invention A combustion catalyst of the third invention comprises (1) at least one of crystalline silica and amorphous silica, (2) a calcium salt, and (3) a copper oxide.

There are no particular limitations on the crystalline silica and/or amorphous-silica; publicly known one(s) or commercially sold one(s) can be used.

There are no particular limitations the calcium salt(s); the same one(s) as those described for the combustion catalyst of the first invention can be used.

There are no particular limitations on the copper oxide(s); CuO, $Cu_2O$ or the like produced by baking the copper compound(s) described for the combustion catalyst of the first invention can be used.

There are no particular limitations on the proportions of (1) the crystalline silica and/or amorphous silica, (2) the calcium salt(s) and (3) the copper oxide(s) contained in the combustion catalyst; these proportions will vary in accordance with the types of raw materials used and so on, and can, for example, be set as appropriate in accordance with the purpose, desired properties and so on of the final product, from the ranges indicated later in the section on the manufacturing method.

In addition to the above three components (crystalline silica and amorphous silica are taken together as one silica component), the combustion catalyst may contain additives, so long as this is within ranges such as not to interfere with the combustion catalyst activity. There are no particular limitations on such additives; ones publicly known in the field of combustion catalysts can be used. The types, amounts used and so on of the additives can be set as appropriate in accordance with the purpose, desired properties and so on of the final product.

3-2. Method of Manufacturing Combustion Catalyst of the Third Invention

There are no particular limitations on the method of manufacturing the combustion catalyst, so long as a combustion catalyst comprising the three prescribed components is obtained. Examples of the manufacturing method include a method in which (1) crystalline silica and/or amorphous silica, (2) calcium salt(s) and (3) copper oxide(s) are mixed together, and a method in which compounds are reacted together such that at least the three prescribed components are produced through the reaction.

Of these, a method that falls under the latter (i.e. a method using reaction), in particular a method in which calcium silicate and a copper salt are reacted together, and then the reaction product obtained is baked is preferable. Following is a description of this manufacturing method.

There are no particular limitations on the calcium silicate and the copper salt; the same ones as those described for the combustion catalyst of the first invention can be used.

There are also no particular limitations on the method of reacting the calcium silicate and the copper salt together, or on the amount of the copper salt reacted with the calcium silicate; these may be set as described for the combustion catalyst of the first invention.

Through the reaction between the calcium silicate and the copper salt, a reaction product as described for the combustion catalyst of the first invention, i.e. a reaction product comprising calcium salt(s), amorphous silica and copper compound(s) is obtained.

In the case of using the copper salt in an amount less than a reaction equivalent relative to the calcium silicate, unreacted calcium silicate may remain in the reaction product, but this will not hinder the catalytic performance. Moreover, even in the case that a calcium silicate molded body is used and only the surface layer part of the calcium silicate molded body reacts with the copper salt, there will be no hindrance of the catalytic performance.

Next, the reaction product is baked. There are no particular limitations on the baking conditions, but usually the baking is carried out in an oxidizing atmosphere or atmospheric air at 150 to 800° C., preferably 500 to 800° C. There are no particular limitations on the baking time, but this is usually approximately 1 to 10 hours, preferably approximately 2 to 8 hours. Through the baking, the reaction product shrinks, and hence shrinkage when subsequently using as a combustion catalyst at high temperature can be suppressed.

Depending on the baking conditions, the calcium salt(s) may melt/decompose slightly, and hence a calcium oxide may be produced slightly. Copper compound(s) not completely converted into copper oxide(s) may unavoidably remain, and/or copper salt(s) may be produced from the copper compound(s) through the baking process. Some of the amorphous silica may be converted into crystalline silica. Even in such cases, there will be no hindrance of the catalytic performance.

There are no particular limitations on the proportions of the prescribed components contained in the combustion catalyst obtained using the method described above, but usually, out of 100 wt % of the combustion catalyst, the proportion of crystalline silica and/or amorphous silica is approximately 0.5 to 30 wt % (note that, if both crystalline silica and amorphous silica are present, there are no particular limitations on the ratio between crystalline silica and amorphous silica), the proportion of the calcium salt(s) is approximately 1 to 55 wt %, and the proportion of the copper oxide(s) is approximately 2 to 85 wt %. Note, however, that the proportions of the respective components can be set as appropriate in accordance with the desired properties and so on of the combustion catalyst, and are not necessarily limited to being within the above ranges.

There are no particular limitations on the method of shaping the reaction product; a method as described for the combustion catalyst of the first invention can be used. Note that the baking may be carried out either before or after the shaping.

4-1. Automobile Exhaust Gas Purifying Combustion Catalyst of the Fourth Invention A combustion catalyst of the fourth invention comprises (1) at least one of crystalline silica and amorphous silica, and (2) a copper oxide.

There are no particular limitations on crystalline silica and/or amorphous silica; publicly known one(s) or commercially sold one(s) can be used.

There are no particular limitations on the copper oxide(s); CuO, $Cu_2O$ or the like produced by baking the copper compound(s) described for the combustion catalyst of the first invention can be used.

There are no particular limitations on the proportions of the crystalline silica and/or amorphous silica and the copper oxide(s) contained in the combustion catalyst; these proportions will vary in accordance with the types of raw materials used and so on, and can, for example, be set as appropriate in accordance with the purpose, desired properties and so on of the final product, from the ranges indicated later in the section on the manufacturing method.

In addition to the above two components (crystalline silica and amorphous silica are taken together as one silica component), the combustion catalyst may contain additives, so long as this is within ranges such as not to interfere with the combustion catalyst activity. There are no particular limitations on such additives; ones publicly known in the field of combustion catalysts can be used. The types, amounts used and so on of the additives can be set as appropriate in accordance with the purpose, desired properties and so on of the final product.

4-2. Method of Manufacturing Combustion Catalyst of the Fourth Invention

There are no particular limitations on the method of manufacturing the combustion catalyst, so long as a combustion catalyst comprising the two prescribed components is obtained. Examples of the manufacturing method include (i) a method in which (1) crystalline silica and/or amorphous silica, and (2) copper oxide(s) are mixed together, and (ii) a method in which compounds are reacted together such that at least the two prescribed components are produced through the reaction.

Of these, a method that falls under the latter (i.e. a method using reaction) is preferable, in particular:

(i) A method in which a calcium silicate and a copper salt are reacted together, and then the reaction product obtained is washed with water, or is washed with water after carrying out acid treatment or treatment with an aqueous copper salt solution, and is then further baked; or (ii) A method in which a calcium silicate and a copper salt are reacted together, and then the reaction product obtained is baked, and is then further washed with water, or is further washed with water after carrying out acid treatment or treatment with an aqueous copper salt solution.

Following is a description of these manufacturing methods.

There are no particular limitations on the calcium silicate and the copper salt; the same ones as those described for the combustion catalyst of the first invention can be used.

There are also no particular limitations on the method of reacting the calcium silicate and the copper salt together, or on the amount of the copper salt reacted with the calcium silicate, these may be set as described for the combustion catalyst of the first invention.

Through the reaction between the calcium silicate and the copper salt, a reaction product as described for the combustion catalyst of the first invention, i.e. a reaction product comprising calcium salt(s), amorphous silica and copper compound(s) is obtained.

In the case of using the copper salt in an amount less than a reaction equivalent relative to the calcium silicate, the unreacted calcium silicate may remain in the reaction product, but this will not hinder the catalytic performance. Moreover, even in the case that a calcium silicate molded body is used and only the surface layer part of the calcium silicate molded body reacts with the copper salt, there will be no hindrance of the catalytic performance.

With method (i), after the reaction between the calcium silicate and the copper salt, the reaction product is washed with water, or is washed with water after carrying out acid treatment or treatment with an aqueous copper salt solution, and is then further baked.

As the conditions for the washing with water, and/or for the acid treatment or treatment with an aqueous copper salt solution, conditions as described for the combustion catalyst of the second invention can be used. Depending on the conditions for the washing with water, and/or for the acid treatment or treatment with an aqueous copper salt solution, a small amount of a calcium salt may unavoidably remain in the reaction product, but this will not particularly hinder the catalytic performance.

As the baking conditions, conditions as described for the combustion catalyst of the third invention can be used. Depending on the baking conditions, copper compound(s) not completely converted into copper oxide(s) may unavoidably remain, and/or copper salt(s) may be produced from the copper compound(s) through the baking process. Moreover, some of the amorphous silica may be converted into crystalline silica. Even in such cases, there will be no hindrance of the catalytic performance.

With method (ii), after the reaction between the calcium silicate and the copper salt, the reaction product is baked, and is then further washed with water, or is further washed with water after carrying out acid treatment or treatment with an aqueous copper salt solution.

Regarding the baking conditions, and the conditions for the washing with water, and/or for the acid treatment or treatment with an aqueous copper salt solution, these are as described for method (i) above. In the case of method (ii), again calcium salt(s) and copper compound(s) may remain, amorphous silica may be converted into crystalline silica, and so on. Even in such cases, there will be no hindrance of the catalytic performance.

There are no particular limitations on the proportions of the prescribed components contained in the combustion catalyst obtained using method (i) or (ii) described above, but usually, out of 100 wt % of the combustion catalyst, the proportion of crystalline silica and/or amorphous silica is approximately 0.5 to 45 wt % (note that, if both crystalline silica and amorphous silica are present, there are no particular limitations on the ratio between crystalline silica and amorphous silica), and the proportion of copper oxide(s) is approximately 3 to 95 wt %. Note, however, that the proportions of the respective components can be set as appropriate in accordance with the desired properties and so on of the combustion catalyst, and are not necessarily limited to being within the above ranges.

There are no particular limitations on the method of shaping the reaction product; a method as described for the combustion catalyst of the first invention can be used. Note, however, that it is preferable to carry out the washing with water, and/or the acid treatment or treatment with an aqueous copper salt solution before the shaping.

5. Mode of Use of Combustion Catalyst (Automobile Exhaust Gas Purifying Method)

A combustion catalyst of the present invention is for purifying automobile exhaust gas. In particular, the combustion catalyst can be suitably used for purifying carbon monoxide and/or unburnt hydrocarbons in automobile exhaust gas. Examples of unburnt hydrocarbons include acetylene, ethane, propane, propylene, butane, pentane, hexane, heptane, octane, nonane, and so on.

The combustion catalyst of the present invention can be suitably used for converting, out of the automobile exhaust gas components, carbon monoxide and/or propylene in particular into carbon dioxide and/or water. The combustion catalyst of the present invention generally exhibits exhaust gas (in particular carbon monoxide and/or propylene) purifying activity at 150 to 900° C., and in particular exhibits high exhaust gas-purifying activity at 400 to 800° C.

There are no particular limitations on the form of the combustion catalyst of the present invention, which can be set as appropriate in accordance with the mode of use. Examples include a molded body (rod-shaped, plate-shaped, honeycomb-shaped, etc.), a powder, and granules. Moreover, the combustion catalyst may be formed into paper-like sheets or the like using a papermaking method, and such paper-like sheets may be made into a laminate.

In the case of making the combustion catalyst into a molded body, if necessary organic fibers, inorganic fibers or the like may be mixed into the combustion catalyst. As a result, the shape retaining ability, strength and so on of the molded body can be improved.

There are no particular limitations on the method of using the combustion catalyst of the present invention, i.e. the automobile exhaust gas purifying method, so long as the combustion catalyst of the present invention and the exhaust gas can contact one another; the combustion catalyst of the present invention can be used in accordance with an existing exhaust gas combustion catalyst usage method (exhaust gas purifying method). For example, the combustion catalyst and the exhaust gas may be made to contact one another by passing the exhaust gas through a filled body obtained by filling the combustion catalyst in the form of a powder or granules into a reaction tube. More specifically, such a filled body may be installed in a catalytic converter or other exhaust gas flow path. If necessary, the combustion catalyst may be used fixed to a honeycomb or the like. There are no particular limitations on the fixing method and so on; a publicly known method may be used.

6. Action of Combustion Catalyst

Under heating, if automobile exhaust gas contacts a combustion catalyst of the present invention, then the automobile exhaust gas is purified through oxidative combustion. Specifically, automobile exhaust gas components, in particular carbon monoxide and/or unburnt hydrocarbons (especially propylene) are combustively decomposed and thus converted into carbon dioxide and/or water. This combustion catalyst effect can be maintained over a prolonged period.

7. Effects of the Invention

The combustion catalysts of the present invention are less expensive than existing combustion catalysts that have a precious metal as a principal active component thereof.

Moreover, the combustion catalysts of the present invention have high exhaust gas purifying activity. In particular, at 400 to 800° C., the ability to purify carbon monoxide and/or unburnt hydrocarbons (especially propylene) in automobile exhaust gas is high.

BEST MODE FOR CARRYING OUT THE INVENTION

Following is a more detailed description of the characteristic features of the present invention, giving working examples and comparative examples. Note, however, that the scope of the present invention is not limited to these working examples.

WORKING EXAMPLE 1

(Combustion Catalysts of the First and Third Inventions)

(1) A copper oxalate suspension ($CuC_2O_4 \cdot \frac{1}{2}H_2O$: 52 g, water: 2000 g) was added to 349 g (solid content 30 g) of an aqueous slurry of synthetic calcium silicate comprising xonotlite spherical secondary particles, and reaction was carried out by stirring (150 rpm) for 20 hours at 80° C. After the reaction, the slurry was subjected to suction filtration, and the solid matter was dried for 12 hours at 105° C. As a result, a combustion catalyst comprising calcium oxalate, amorphous silica, and a copper compound having X-ray diffraction peaks near $2\theta=23.5°$ and near $2\theta=31.0°$ was obtained.

(2) The combustion catalyst obtained was pressed with a pressure of 8 MPa and then ground and sieved, thus obtaining a granular combustion catalyst with a particle diameter of 1.2 to 4 mm.

(3) For each of the grandular combustion catalyst obtained (Catalyst 1) and granular combustion catalysts obtained by baking this for four hours at 500° C. or 700° C. in atmospheric air, i.e. each of a total of three combustion catalysts, the purification rate (decomposition rate) was calculated for carbon monoxide and propylene in the automobile exhaust gas (model gas) shown in Table 2 below using the method indicated in the test example below. The results are shown in Table 1 below.

Note that the granular combustion catalyst obtained by baking at 500° C. (Catalyst 2) was constituted from copper oxide, calcium carbonate and amorphous silica. The granular combustion catalyst obtained by baking at 700° C. (Catalyst 3) was constituted from copper oxide, calcium oxide and amorphous silica.

TEST EXAMPLE 1

Figure 1:
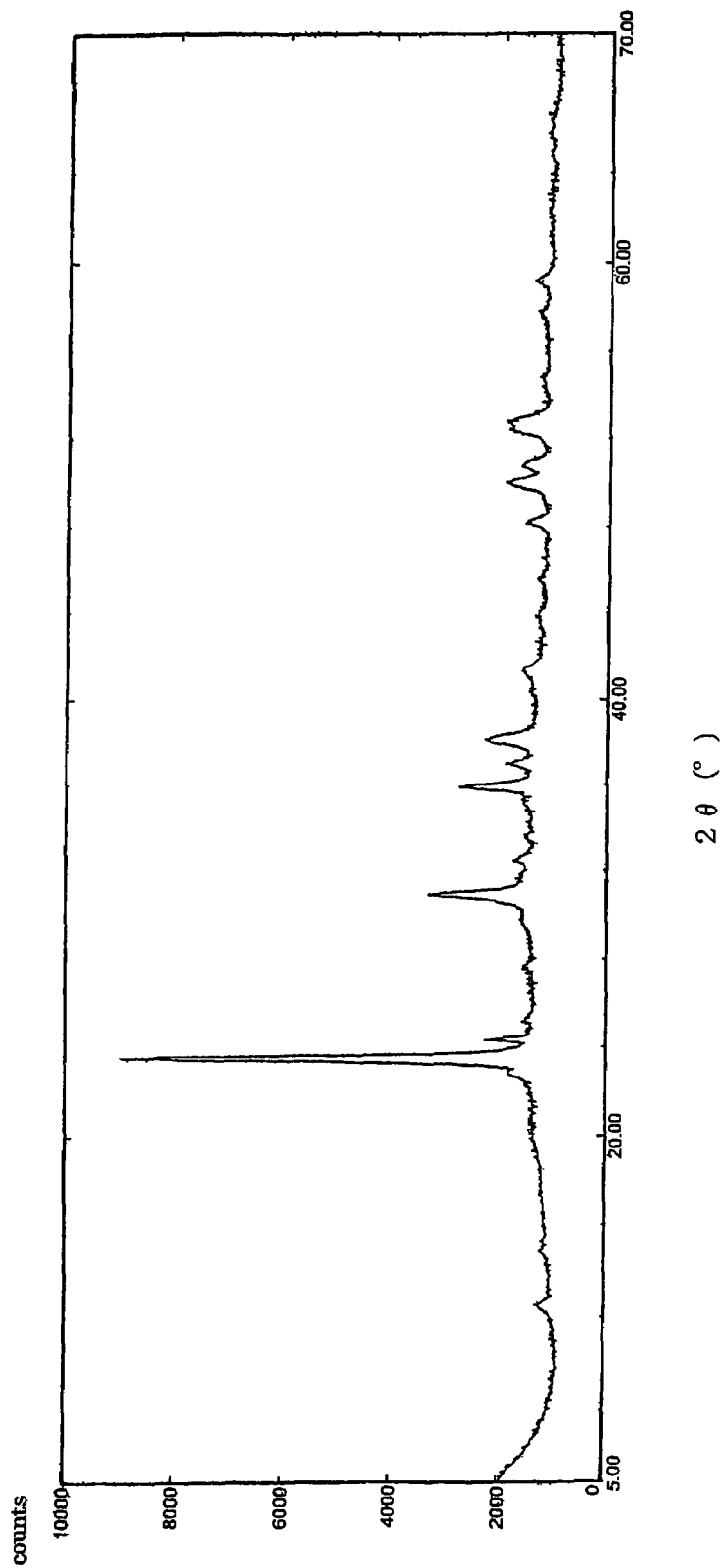
FIG. 1 is an X-ray diffraction diagram of a granular combustion catalyst obtained in Working Example 1.
Figure 2:
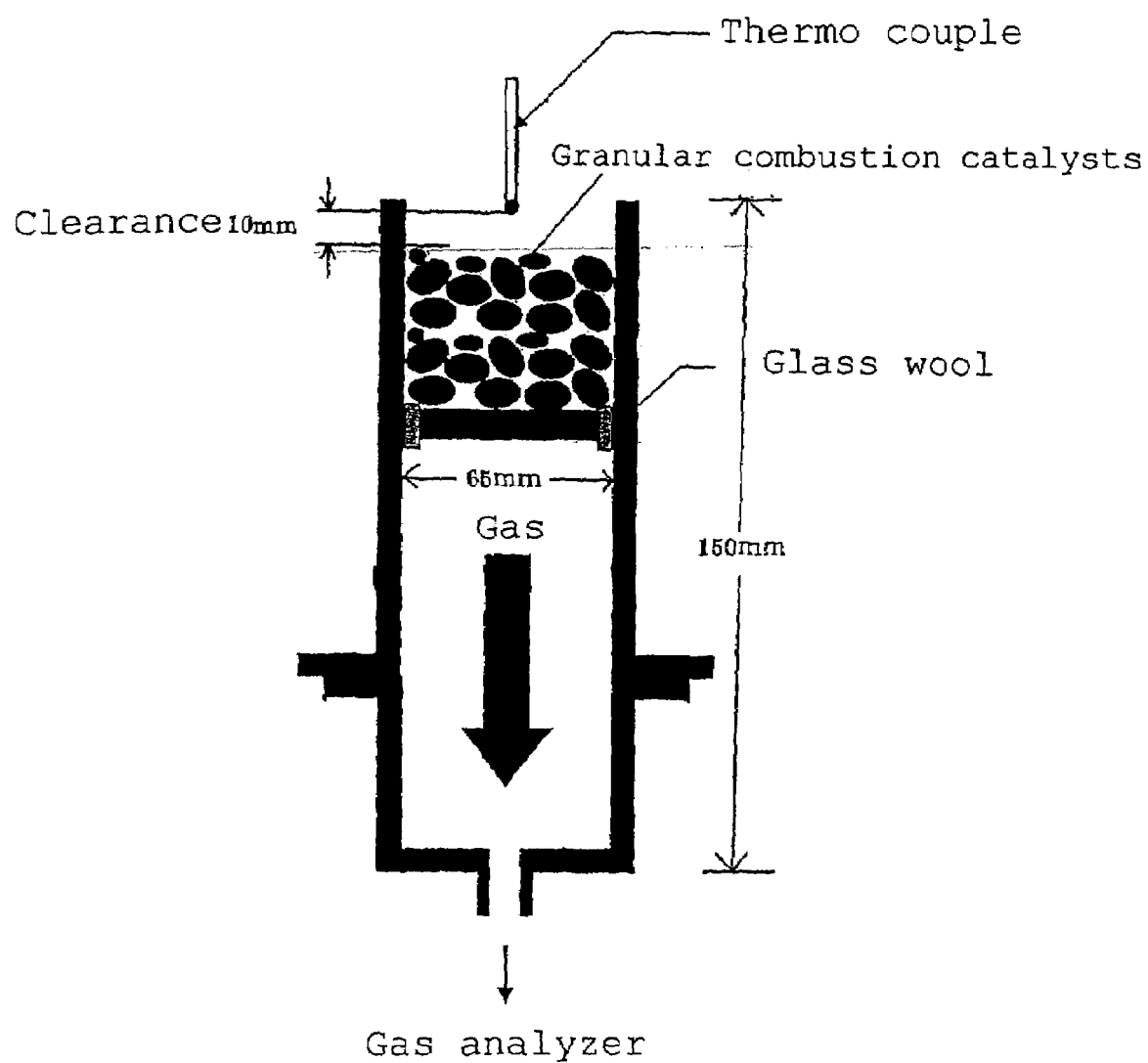
FIG. 2 is a schematic drawing of a reaction tube used in a test example in the working examples.

20 g of each of Catalysts 1 to 3 was weighed out, and was put into a reaction tube as shown in FIG. 2. The reaction tube was heated from room temperature to 450° C. at a heating rate of 20° C./min, while passing a model gas of the composition shown in Table 2 below through the reaction tube at a flow rate of 25.7 l/min. The concentration of each gas discharged from the outlet side of the reaction tube once the temperature had reached 450° C. was analyzed using gas chromatography, and the propylene using the following formula.

Purification rate (%)=$\{1-C_1/C_0\} \times 100$, $C_0$: Concentration of carbon monoxide or propylene gas introduced from inlet side of reaction tube $C_1$: Concentration of carbon monoxide or propylene gas discharged from outlet side of reaction tube

TABLE 1

|  | Catalyst 1 (unbaked) | Catalyst 2 (baked at 500° C.) | Catalyst 3 (baked at 700° C.) |
| --- | --- | --- | --- |
| Purification rate for carbon monoxide (%) | 97 | 96 | 91 |
| Purification rate for propylene (%) | 59 | 72 | 52 |

TABLE 2

Model gas composition

| Gas | | | | | | | |
|---|---|---|---|---|---|---|---|
| CO | $C_3H_6$ | $H_2$ | NO | $CO_2$ | $O_2$ | $N_2$ | $H_2O$ |
| Concentration of gas (%) 0.5 | 0.04 | 0.17 | 0.05 | 14 | 0.5 | 74.74 | 10 |

WORKING EXAMPLE 2

(Combustion catalysts of the second and fourth inventions)

(1) The post-reaction slurry obtained in (1) in Working Example 1 was subjected to suction filtration, and the solid matter was made to contact a copper sulfate aqueous solution ($CuSO_4.5H_2O$: 138.4 g, water: 2000 g). Next, the solid matter was washed with water until the solid matter become neutral, thus removing the calcium oxalate. Next, the solid matter was dried for 12 hours at 105° C. As a result, a combustion catalyst comprising amorphous silica, copper oxalate and basic copper sulfate ($Cu_4SO_4(OH)_6$) was obtained.

(2) The combustion catalyst obtained was pressed with a pressure of 8 MPa and then ground and sieved, thus obtaining a granular combustion catalyst with a particle diameter of 1.2 to 4 mm.

(3) For each of the granular combustion catalyst obtained (Catalyst 4) and granular combustion catalysts obtained by baking this for four hours at 500° C. or 700° C. in atmospheric air, i.e. each of a total of three combustion catalysts, using the same method as in the test example described earlier, the purification rate was calculated for carbon monoxide and propylene in the model gas shown in Table 2 earlier. The results are shown in Table 3 below.

Note that the granular combustion catalyst obtained by baking at 500° C. (Catalyst 5) and the granular combustion catalyst obtained by baking at 700° C. (Catalyst 6) were each constituted from copper oxide and amorphous silica.

TABLE 3

| | Catalyst 4 (unbaked) | Catalyst 5 (baked at 500° C.) | Catalyst 6 (baked at 700° C.) |
|---|---|---|---|
| Purification rate for carbon monoxide (%) | 63 | 71 | 63 |
| Purification rate for propylene (%) | 59 | 70 | 52 |

WORKING EXAMPLE 3

(Combustion Catalysts of the Second and Fourth Inventions)

(1) A copper sulfate aqueous solution ($CuSO_4.0.5H_2O$: 39.3 g, water: 1000 g) was added to 1070 g (solid content 89.2 g) of an aqueous slurry of synthetic calcium silicate comprising xonotlite spherical secondary particles, and reaction was carried out by stirring (250 rpm) for one hour at 20° C. After the reaction, the slurry was subjected to suction filtration, and the solid matter was washed with water until neutral, and then dried for 12 hours at 105° C. As a result, a combustion catalyst comprising basic copper sulfate ($Cu_4SO_4(OH)_6$) and amorphous silica was obtained.

(2) The combustion catalyst obtained was pressed with a pressure of 8 MPa and then ground and sieved, thus obtaining a granular combustion catalyst with a particle diameter of 1.2 to 4 mm.

(3) For each of the granular combustion catalyst obtained (Catalyst 7) and a granular combustion catalyst obtained by baking this for four hours at 500° C. in atmospheric air, i.e. each of a total of two combustion catalysts, using the method indicated in the test example described earlier, the purification rate was calculated for carbon monoxide and propylene in the model gas shown in Table 2 earlier. The results are shown in Table 4 below.

Note that the granular combustion catalyst obtained by baking at 500° C. (Catalyst 8) was constituted from copper oxide, another oxide of copper ($Cu_2O(SO_4)$), copper sulfate and amorphous silica.

TABLE 4

| | Catalyst 7 (unbaked) | Catalyst 8 (baked at 500° C.) |
|---|---|---|
| Purification rate for carbon monoxide (%) | 64 | 63 |
| Purification rate for propylene (%) | 59 | 57 |

WORKING EXAMPLE 4

(Combustion Catalysts of the Second and Fourth Inventions)

(1) A copper nitrate aqueous solution ($Cu(NO_3)_2.3H_2O$: 107.6 g, water: 2000 g) was added to 750 g (solid content 50 g) of an aqueous slurry of synthetic calcium silicate comprising tobermorite spherical secondary particles, and reaction was carried out by stirring (250 rpm) for one hour at 20° C. After the reaction, the slurry was subjected to suction filtration, and the solid matter was washed with water until neutral, and then dried for 12 hours at 105° C. As a result, a combustion catalyst comprising basic copper nitrate ($Cu_2(OH)_3NO_3$), amorphous silica, and a small amount of synthetic calcium silicate (tobermorite) was obtained.

(2) The combustion catalyst obtained was pressed with a pressure of 8 MPa and then ground and sieved, thus obtaining a granular combustion catalyst with a particle diameter of 1.2 to 4 mm.

(3) For each of the granular combustion catalyst obtained (Catalyst 9) and granular combustion catalysts obtained by baking this for four hours at 500° C. or 700° C. in atmospheric air, i.e. each of a total of three combustion catalysts, using the method indicated in the test example described earlier, the purification rate was calculated for carbon monoxide and propylene in the model gas shown in Table 2 earlier. The results are shown in Table 5 below.

Note that the granular combustion catalyst obtained by baking at 500° C. (Catalyst 10) was constituted from copper oxide, α-quartz (crystalline silica), and a small amount of synthetic calcium silicate (tobermorite). The granular combustion catalyst obtained by baking at 700° C. (Catalyst 11) was constituted from copper oxide, α-quartz, and a small amount of β-wallastonite.

TABLE 5

|  | Catalyst 9 (unbaked) | Catalyst 10 (baked at 500° C.) | Catalyst 11 (baked at 700° C.) |
|---|---|---|---|
| Purification rate for carbon monoxide (%) | 88 | 83 | 68 |
| Purification rate for propylene (%) | 49 | 46 | 31 |

INDUSTRIAL APPLICABILITY

The automobile exhaust gas purifying combustion catalysts of the present invention have high exhaust gas purifying activity. In particular, at 400 to 800° C., the ability to purify carbon monoxide and/or unburnt hydrocarbons (especially propylene) contained in automobile exhaust gas is high.

The invention claimed is:

1. A method of manufacturing an automobile exhaust gas purifying combustion catalyst comprising a calcium salt, amorphous silica, and a copper compound, comprising reacting copper oxalate with calcium silicate to produce the calcium salt, the amorphous silica and the copper compound.

2. A method of manufacturing an automobile exhaust gas purifying combustion catalyst comprising amorphous silica and a copper compound, comprising reacting copper oxalate with calcium silicate to produce the amorphous silica and the copper compound, and washing the reaction product obtained with water.

3. A method of manufacturing an automobile exhaust gas purifying combustion catalyst comprising (1) at least one of crystalline silica and amorphous silica, (2) a calcium salt, and (3) a copper oxide, comprising reacting copper oxalate with calcium silicate to produce (1) at least one of crystalline silica and amorphous silica, (2) a calcium salt, and (3) a copper oxide, and baking the reaction product obtained.

4. A method of manufacturing an automobile exhaust gas purifying combustion catalyst comprising (1) at least one of crystalline silica and amorphous silica, and (2) a copper oxide, comprising reacting a copper oxalate with calcium silicate to produce (1) at least one of crystalline silica and amorphous silica, (2) a calcium salt, and (3) a copper oxide, washing the reaction product obtained with water, and then baking the reaction product obtained.

5. A method of manufacturing an automobile exhaust gas purifying combustion catalyst comprising (1) at least one of crystalline silica and amorphous silica, and (2) a copper oxide, comprising reacting copper oxalate with calcium silicate to produce (1) at least one of crystalline silica and amorphous silica, (2) a calcium salt, and (3) a copper oxide, baking the reaction product obtained, and then washing the reaction product obtained with water.

6. An automobile exhaust gas purifying combustion catalyst prepared by the method according to any one of claims 1 to 5.

7. The method according to any one of claims 1 to 5, wherein the reacting step comprises a step selected from the group consisting of mixing the copper oxalate into an aqueous slurry of the calcium silicate, impregnating a solution of the copper oxalate into a molded body of the calcium silicate, and mixing a calcium silicate powder into a solution of the copper oxalate.

8. The method according to any one of claims 2, 4, or 5, further comprising treating the reaction product obtained with an acid or an aqueous copper salt solution prior to washing the reaction product obtained with water.

* * * * *